United States Patent
Tanigawa et al.

(10) Patent No.: US 6,399,699 B1
(45) Date of Patent: Jun. 4, 2002

(54) POLYACETAL RESIN COMPOSITION EXCELLENT IN AGING RESISTANCE

(75) Inventors: Yukio Tanigawa; Tadashige Hata, both of Kurashiki (JP)

(73) Assignee: Asahi Kasei Kogyo Kabushiki Kaisha, Osaka (JP)

( * ) Notice: Subject to any disclaimer, the term of this patent is extended or adjusted under 35 U.S.C. 154(b) by 0 days.

(21) Appl. No.: 08/799,411

(22) Filed: Feb. 12, 1997

(30) Foreign Application Priority Data

Feb. 19, 1996 (JP) ............................................... 8-030214

(51) Int. Cl.⁷ ................................................. C08K 5/09
(52) U.S. Cl. ....................................................... 524/593
(58) Field of Search .............................. 524/100, 425, 524/291, 593, 255, 102, 103, 104, 232, 233, 234, 239, 242, 400

(56) References Cited

U.S. PATENT DOCUMENTS

| | | | | |
|---|---|---|---|---|
| 2,768,994 A | * | 10/1956 | MacDonald | 524/593 |
| 2,989,509 A | * | 6/1961 | Hudgin et al. | |
| 3,027,352 A | * | 3/1962 | Walling et al. | 528/232 |
| 3,252,940 A | * | 5/1966 | Mantell | 528/232 |
| 3,313,767 A | * | 4/1967 | Berardinelli et al. | 524/593 |
| 3,397,182 A | * | 8/1968 | Charles et al. | 528/232 |
| 3,484,399 A | * | 12/1969 | Kakos | 524/593 |
| 3,743,614 A | | 7/1973 | Wolters et al. | 260/18 |
| 4,342,680 A | | 8/1982 | Sugio et al. | 524/100 |
| 4,431,794 A | * | 2/1984 | Sadlowski et al. | 528/232 |
| 4,727,106 A | * | 2/1988 | Paul et al. | 524/593 |
| 4,931,535 A | * | 6/1990 | Yamamoto et al. | 528/232 |
| 5,191,006 A | * | 3/1993 | Matsumoto et al. | 524/593 |
| 5,502,093 A | * | 3/1996 | Katsumata et al. | 524/593 |

FOREIGN PATENT DOCUMENTS

| | | |
|---|---|---|
| GB | 1425771 | 2/1976 |
| JP | 55-22508 | 6/1980 |
| JP | 60-56748 | 12/1985 |
| JP | 62-58387 | 12/1987 |
| JP | 2-209944 | 8/1990 |

* cited by examiner

Primary Examiner—Veronica P. Hoke
(74) Attorney, Agent, or Firm—Pennie & Edmonds LLP

(57) ABSTRACT

A polyacetal resin composition which comprises about 100 parts by weight of a polyacetal having a residual fluorine concentration of not more than about 13 ppm and a concentration of formaldehyde generated when the polyacetal is heated at about 230° C. for about 30 minutes in nitrogen of not more than about 500 ppm; from about 0.01 to about 3 parts by weight of an antioxidant; and from about 0.001 to about 5 parts by weight of a basic substance. The above polyacetal resin composition is excellent in long-term thermal aging resistance under high-temperature circumstances.

17 Claims, No Drawings

POLYACETAL RESIN COMPOSITION EXCELLENT IN AGING RESISTANCE

BACKGROUND OF THE INVENTION

1. Field of the Invention

This invention relates to a polyacetal resin composition excellent in long-term thermal aging resistance, more particularly to a polyoxymethylene composition which has characteristics of polyoxymethylene such as mechanical properties, moldability, thermal stability and the like and is excellent in long-term thermal aging resistance under high-temperature circumstances.

2. Description of the Related Art

Polyacetal resins are known as engineering resins excellent in mechanical properties, rigidity, creep characteristics, solvent resistance and the like, and used in a wide field including, for example, mechanical moving parts and the like used in automobile, electrical appliances and the like. As the uses of resins are widened and diversified, the demand for quality has become severe. In particular, in the use thereof under high-temperature circumstances, long-term thermal aging resistance is required. However, no conventional polyacetal resins have aging resistance on a satisfactory level, and the use thereof is limited at present.

As a conventional method for preventing the polyacetal resin from being deteriorated under high-temperature circumstances, there has been known a method in which an additive such as a thermal stabilizer, an antioxidant or the like is compounded. For example, JP-B-62-58,387 and U.S. Pat. No. 4,342,680 propose improving the thermal stability with an additive composed of a ternary combination of an amine-substituted triazine, a sterically hindered phenol and a metal-containing compound. JP-A-2-209,944 proposes improving the long-term thermal resistance by the co-use of three kinds of antioxidants with a calcium salt of a fatty acid. Also, JP-B-55-22,508 and U.S. Pat. No. 3,743,614 disclose improving the stability against oxidation and thermal decomposition by use of a hindered phenolic compound together with an alkaline earth metal salt of a carboxylic acid having 10 to 20 carbon atoms and/or an alkaline earth metal hydroxide. Furthermore, JP-B-60-56,748 and UK-A-1,425,771 propose improving the stability against heat and oxygen by use of a hindered phenolic compound and an alkaline earth metal salt of an aliphatic carboxylic acid having 22 to 36 carbon atoms.

Though the long-term thermal aging resistance of a polyacetal resin can be improved by compounding therein an additive, the improvement is still insufficient. The use of such polyacetal resins over a long period of time under high temperature circumstance results in the reduction of mechanical properties and ultimately leads to degradation of the polyacetal resin.

SUMMARY OF THE INVENTION

It is therefore an object of the present invention to overcome the disadvantages of conventional polyacetal resins, to provide a polyacetal resin composition excellent in long-term thermal aging resistance, and to provide methods for making the same.

The present inventors have examined the long-term thermal aging resistance of polyacetal resins and have consequently found that a polyacetal resin composition comprising a particular polyacetal, an antioxidant and a basic substance in specific amounts achieves the above-mentioned object, based on which this invention has been completed.

According to this invention, there is provided a polyacetal resin composition which comprises 100 parts by weight of a polyacetal such that the residual fluorine concentration is not more than about 13 ppm and that when the resin is heated at about 230° C. for about 30 minutes in nitrogen the concentration of formaldehyde generated is not more than about 500 ppm, from about 0.01 to about 3 parts by weight of an antioxidant and from about 0.001 to about 5 parts by weight of a basic substance.

DESCRIPTION OF PREFERRED EMBODIMENTS OF THE INVENTION

The polyacetal used in the resin composition of this invention is produced by, for example, the following method:

First of all, the main monomer used in the production of the polyacetal is trioxane which is a cyclic oligomer of formaldehyde and the comonomer used therewith is a cyclic ether represented by the following general formula (I):

wherein each of $R_1$ to $R_4$ independently represents a hydrogen atom, a $C_1$–$C_5$ alkyl group which is unsubstituted or substituted with 1 to 3 halogen atoms, and each $R_5$ independently represents a methylene or oxymethylene group, which is unsubstituted or substituted with 1 or 2 $C_1$–$C_5$ alkyl groups or 1 or 2 halogen atoms (in this case, p represents an integer of 0 to 3), or each $R_5$ independently represents a divalent group represented by the following formula (II) or (III):

in which p in the formula (I) is 1 and q in the formula (II) or (III) represents an integer of 1 to 4.

Typical examples of other comonomers include, for example, ethylene oxide, propylene oxide, 1,3-dioxorane, 1,3,5-trioxepane, 1,4-butanediolformal, epichlorohydrin diglycolformal and the like. The concentration of the comonomer is not critical; however, it is usually not less than 0.0005 mole but not more than 0.15 mole per mole of the trioxane.

As the polyacetal in this invention, there can be used either a homopolymer obtained by homopolymerizing the above trioxane or a copolymer obtained by polymerizing a mixture of the above trioxane and the above comonomer.

A suitable polymerization catalyst which can be used in the production of the polyacetal of the present invention includes, but is not limited to, at least one of boron trifluoride, boron trifluoride hydrate, a coordination complex compound of boron trifluoride with an organic compound containing an oxygen atom or a sulfur atom (e.g. an ether such as diethyl ether, di-n-butyl ether, a thioether such as ethylthioether). The polymerization catalyst is preferably a coordination complex compound of boron trifluoride with the above organic compound, and the coordination complex compound includes, but is not limited to, boron trifluoride diethyl ether, boron trifluoride dibutyl ether or mixtures thereof.

During the polyacetal production using the above polymerization catalyst, residual fluorine is accumulated. An important point of this invention is to use a polyacetal having a residual fluorine concentration of not more than about 13 ppm. It is preferable to use a polyacetal having a residual fluorine concentration of not more than about 8 ppm. When the residual fluorine concentration of the polyacetal exceeds about 13 ppm, the use of a polyacetal resin composition under high-temperature circumstances for a long period of time results in reduction of the long-term thermal aging resistance of the resin composition.

As a method for producing a polyacetal having a low residual fluorine concentration, it is effective to control the polymerization catalyst concentration to not more than a certain value during the polymerization. Specifically, it is preferable to control the polymerization catalyst concentration to not more than about $3.0 \times 10^{-5}$ mole per mole of trioxane or, if a comonomer is used, per mole of a total of trioxane and the comonomer(s). In particular, in order to obtain a polyacetal having a residual fluorine concentration of not more than about 8 ppm, it is preferable to control the polymerization catalyst concentration to not more than $1.5 \times 10^{-5}$ mole per mole of trioxane or, if a comonomer is used, per mole of a total of trioxane and the comonomer(s). When the polymerization catalyst concentration is high during the polymerization and the residual fluorine concentration of the polyacetal produced by the polymerization is more than about 13 ppm, it is possible to wash the polyacetal with a solvent to remove the polymerization catalyst therefrom to reduce the residual fluorine concentration of the polyacetal to not more than about 13 ppm. Specifically, washing methods, include but are not limited to, washing, with hot water, steam or a mixture of water and an organic solvent at a high temperature, a polyacetal obtained by deactivating the polymerization catalyst just after the polymerization or a polyacetal obtained by deactivating the polymerization catalyst and converting the unstable terminal portions present in the polyacetal by decomposition into stable terminals, namely a polyacetal subjected to a so-called terminal stabilization procedure or treatment, or the like. For example, by treating the terminally stabilized polyacetal with an aqueous solution containing about 15% of methanol at a temperature from about 80° C. to about 150° C. for a period from about 10 min to about several hours (for example, from 1 to 3 hours), the residual fluorine concentration in the polyacetal can be adjusted to about 13 ppm or less. The conditions for this washing treatment are appropriately determined depending upon the residual fluorine concentration of the polyacetal before the washing treatment.

Another important feature of this invention is to provide a polyacetal such that the concentration of formaldehyde generated when the polyacetal is heated at about 230° C. for about 30 minutes in nitrogen is not more than about 500 ppm, preferably not more than about 300 ppm. When the concentration of formaldehyde generated under the above-mentioned heating conditions exceeds about 500 ppm, the use of the polyacetal resin composition under high-temperature circumstances results in reduction of the long-term thermal aging resistance thereof.

In the production of the polyacetal such that the concentration of formaldehyde generated is not more than about 500 ppm, the terminal stabilization treatment is accomplished using an extruder by the following three steps: (1) the step of converting the polyacetal to its molten state, (2) the step of adding a liquid mixture of water with an alkaline substance such as triethylamine or the like to the molten polyacetal and kneading the resulting mixture to stabilize the terminals and (3) the step of removing free formaldehyde and the liquid mixture of water with the alkaline substance added in step (2) by degassification under reduced pressure. Also, for further lowering the concentration of any formaldehyde generated, the polyacetal may be subjected several times to the above terminal stabilization procedure.

A resin composition obtained by compounding an antioxidant and a basic substance with the thus obtained polyacetal has excellent long-term thermal aging resistance.

The antioxidant used in this invention is a hindered phenol compound and/or a hindered amine compound.

The hindered phenol compound includes, but is not limited to, n-octadecyl 3-(3,5-di-t-butyl-4-hydroxyphenyl) propionate, n-octadecyl 3-(3-methyl-5-t-butyl-4-hydroxyphenyl)propionate, n-tetradecyl 3-(3,5-di-t-butyl-4-hydroxyphenyl)propionate, 1,6-hexanediol bis[3-(3,5-di-t-butyl-4-hydroxyphenyl)propionate], 1,4-butanediol bis[3-(3,5-di-t-butyl-4-hydroxyphenyl)propionate], triethylene glycol bis[3-(3-t-butyl-5-methyl-4-hydroxyphenyl) propionate], pentaerythrityl tetrakis[3-(3,5-di-t-butyl-4-hydroxyphenyl)propionate], 3,9-bis{2-[3-(3-t-butyl-4-hydroxy-5-methylphenyl)propionyloxy]-1,1-dimethylethyl}-2,4,8,10-tetraoxaspiro-(5,5)undecane, N,N'-bis[3-(3,5-di-t-butyl-4-hydroxyphenyl)propionyl] hexamethylenediamine, N,N'-tetramethylenebis[3-(3-methyl-5-t-butyl-4-hydroxyphenyl)propionyl]diamine, N,N'-bis[3-(3,5-di-t-butyl-4-hydroxyphenyl)propionyl] hydrazine or mixtures thereof.

The hindered amine compound includes, but is not limited to, 4-acetoxy-2,2,6,6-tetramethylpiperidine, 4-stearoyloxy-2,2,6,6-tetramethylpiperidine, 4-acryloyloxy-2,2,6,6-tetramethylpiperidine, 4-(phenylacetoxy)-2,2,6,6-tetramethylpiperidine, 4-benzoyloxy-2,2,6,6-tetramethylpiperidine, 4-methoxy-2,2,6,6-tetramethylpiperidine, 4-stearyloxy-2,2,6,6-tetramethylpiperidine, 4-cyclohexyloxy-2,2,6,6-tetramethylpiperidine, 4-benzyloxy-2,2,6,6-tetramethylpiperidine, 4-phenoxy-2,2,6,6-tetramethylpiperidine, 4-(ethylcarbamoyloxy)-2,2,6,6-tetramethylpiperidine, 4-(cyclohexylcarbamoyloxy)-2,2,6,6-tetramethylpiperidine, 4-(phenylcarbamoyloxy)-2,2,6,6-tetramethylpiperidine, bis(2,2,6,6-tetramethyl-4-piperidyl) carbonate, bis(2,2,6,6-tetramethyl-4-piperidyl)oxalate, bis (2,2,-6,6-tetramethyl-4-piperidyl)malonate, bis(2,2,6,6-tetramethyl-4-piperidyl)sebacate, bis(2,2,6,6-tetramethyl-4-piperidyl)adipate, bis(2,2,6,6-tetramethyl-4-piperidyl) terephthalate, 1,2-bis(2,2,6,6-tetramethyl-4-piperidyl-oxy) ethane, α,α'-bis(2,2,6,6-tetramethyl-4-piperidyloxy)-p-xylene, bis(2,2,6,6-tetramethyl-4-piperidyl)tolylene 2,4-dicarbamate, bis(2,2,6,6-tetramethyl-4-piperidyl) hexamethylene 1,6-dicarbamate, tris(2,2,6,6-tetramethyl-4-piperidyl)benzene 1,3,5-tricarboxylate, tris(2,2,6,6-tetramethyl-4-piperidyl)benzene 1,3,4-tricarboxylate, 1-{2-[3-(3,5-di-t-butyl-4-hydroxyphenyl)propionyloxy]-ethyl}-4-[3-(3,5-di-t-butyl-4-hydroxyphenyl)propionyloxy]-2,2,6, 6-tetramethylpiperidine, a condensation product of 1,2,3,4-butanetetracarboxylic acid with 1,2,2,6,6-pentamethyl-4-piperidinol and β,β,β',β'-tetramethyl-3,9-(2,4,8,10-tetraoxaspiro-(5,5)undecane)diethanol or mixtures thereof.

In this invention, the antioxidant comprises at least one member selected from the group consisting of the above-mentioned hindered phenol compound and hindered amine compound. The amount of the antioxidant added is 0.01 to 3 parts by weight, preferably 0.01 to 1.0 part by weight, per 100 parts by weight of the polyacetal.

The basic substance used in this invention is a nitrogen-containing compound and/or a metal-containing compound such as a hydroxide, inorganic acid salt or carboxylic acid salt of an alkali metal or alkaline earth metal or mixtures thereof.

The nitrogen-containing compound includes, but is not limited to, dicyandiamide, guanamine (2,4-diamino-sym-triazine), melamine (2,4,6-triamino-sym-triazine), N-butylmelamine, N-phenylmelamine, N,N-diphenylmelamine, N,N-diallylmelamine, N,N',N"-triphenylmelamine, N-methylolmelamine, N,N'-dimethylolmelamine, N,N',N"-trimethylolmelamine, benzoguanamine (2,4-diamino-6-phenyl-sym-triazine), 2,4-diamino-6-methyl-sym-triazine, 2,4-diamino-6-butyl-sym-triazine, 2,4-diamino-6-benzyloxy-sym-triazine, 2,4-diamino-6-butoxy-sym-triazine, 2,4-diamino-6-cyclohexyl-sym-triazine, 2,4-diamino-6-chloro-sym-triazine, 2,4-diamino-6-mercapto-sym-triazine, 2,4-dihydroxy-6-amino-sym-triazine, 2-hydroxy-4,6-diamino-sym-triazine, N,N',N', N'-tetra-cyanoethylbenzoguanamine or mixtures thereof. Preferable are dicyandiamide, guanamine (2,4-diamino-sym-triazine) and melamine (2,4,6-triamino-sym-triazine).

As the other basic substance, there are used metal-containing compounds such as hydroxides, inorganic acid salts, carboxylic acid salts of alkali metals and/or alkaline earth metals. The alkali metals include, but are not limited to, lithium, sodium, potassium or mixtures thereof; and the alkaline earth metals include, but are not limited to, magnesium, calcium, barium or mixtures thereof. The inorganic acid salts of these metals include, but are not limited to, carbonates, silicates, phosphates or mixtures thereof. The carboxylic acid salts of these metals include, but are ot limited to, salts of saturated aliphatic carboxylic acids such as capric acid, lauric acid, myristic acid, palmitic acid, stearic acid, arachidic acid, behenic acid, lignoceric acid, cerotic acid, montanic acid, melissic acid, ceroplastic acid or mixtures thereof with these metals and salts of unsaturated aliphatic carboxylic acids such as undecylenic acid, oleic acid, elaidic acid, cetoleic acid, erucic acid, brassidic acid, sorbic acid, linoleic acid, linolenic acid, arachidonic acid, propiolic acid, stearolic acid or mixtures thereof with these metals. Among these carboxylic acid salts, the lauric acid salts, stearic acid salts behenic acid salts or mixtures thereof are particularly preferred.

The basic substance in this invention is at least one compound selected from the group consisting of the above-mentioned nitrogen-containing compounds, the above-mentioned hydroxides, inorganic acid salts, carboxylic acid salts of alkali metals, carboxylic acid salts of alkaline earth metals and mixtures thereof. The amount of the basic substance added is from about 0.001 to about 5 parts by weight, preferably from about 0.005 to about 1.0 part by weight, per 100 parts by weight of the polyacetal.

The time at which the antioxidant and the basic substance are added to the polyacetal may be either before or after the terminal stabilization of the olyacetal; however, this is not critical.

Moreover, the composition of this invention may nclude other additives which have heretofore been known, for example, a thermal stabilizer, a release agent, an antistatic agent, a lubricant, a nucleating agent, a surfactant or the like for imparting the desired characteristics to the composition depending upon the purpose, and in addition thereto, there can be added an organic macromolecular or polymer material, an inorganic or organic fibrous, powdery or plate-like filler, a pigment or the like or mixtures thereof.

Examples and Comparative Examples are shown below to explain this invention in more detail; however, they are illustrative and not intended to limit the scope of the present invention or claims.

EXAMPLES

The values shown in the Examples and the Comparative Examples were determined as follows:

Residual Fluorine Concentration

A polyacetal was thermally decomposed with 1 N HCl and thereafter the concentration of fluorine in the polyacetal was measured using a fluorine ion electrode (manufactured by HORIBA).

Concentration of Formaldehyde Generated

A polyacetal was heated in a nitrogen stream at 230° C. and the gas obtained was absorbed by water for 30 minutes, after which the concentration of formaldehyde was determined by titration using sodium sulfite.

Long-term Thermal Aging Resistance

A polyacetal resin molded article (molding machine: Toshiba 100E, molded article: dumbbell piece) was placed in a Geer oven at 140° C. and the deterioration state of the molded article was evaluated based on the period (days) during which the molded article retained 70% of the tensile strength just after the molding.

Example 1

The temperature of a twin screw self-cleaning type polymerizing machine (L/D=8) provided with a jacket through which a heating medium could be passed was adjusted to 80° C. Thereto trioxane was continuously fed at a rate of 3 kg/hr being mixed with 1,3-dioxorane as a comonomer in a proportion of 4.5 mole % based on trioxane. Methylal was used as a molecular weight regulator in an amount of $1.5 \times 10^{-3}$ per mole based on 3 kg of trioxane being added per hour. To the mixture was added boron trifluoride dibutyl ether as a polymerization catalyst in a proportion of $1.2 \times 10^{-5}$ mole per mole of a total of all the monomers. Thereby, the resulting mixture was subjected to polymerization. The polymer obtained from the outlet of the polymerizing machine was immediately placed in 1% triethylamine to deactivate the polymerization catalyst, and then dried.

The resulting dried polymer was fed to a twin screw vented extruder provided with a terminal stabilization zone and a devolatilization zone, and subjected to terminal stabilization treatment at 200° C. Water as a terminal stabilizing agent and triethylamine as a basic substance were added in respective amounts of 2.5 parts by weight and 0.5 part by weight, per 100 parts by weight of the polymer. The degree of vacuum in the vent portion of the devolatilization zone was adjusted to 30 torr, under which conditions devolatilization was conducted. The polymer was extruded in the form of a strand from the dies of the extruder and then pelletized, to yield a pelletized polyacetal.

The residual fluorine concentration of the polyacetal thus obtained was 6.8 ppm. The concentration of formaldehyde generated when the polyacetal was heated in nitrogen at 230° C. for 30 minutes was 120 ppm.

Moreover, the polyacetal thus obtained were compounded with 0.3 part by weight of triethylene glycol bis[3-(3-t-butyl-5-methyl-4-hydroxyphenyl)propionate] as an antioxidant and 0.1 part by weight of calcium stearate as a basic substance, and the compound obtained was then molded, after which the molded article thus obtained was subjected to evaluation of long-term thermal aging resistance, to obtain the results shown in Table 1.

Example 2

Procedure from the polymerization to the pelletization of polyacetal was followed in the same manner as in Example 1, except that boron trifluoride diethyl ether was added as a polymerization catalyst in a proportion of $1.4 \times 10^{-5}$ mole per mole of a total of all the monomers in place of the boron trifluoride dibutyl ether. The residual fluorine concentration of the polyacetal obtained was 7.7 ppm. The concentration of formaldehyde generated when the polyacetal was heated at 230° C. for 30 minutes in nitrogen was 180 ppm. To this polyacetal were added 0.3 part by weight of triethylene glycol bis[3-(3-t-butyl-5-methyl-4-hydroxyphenyl) propionate] as an antioxidant and 0.1 part by weight of calcium stearate as a basic substance, and the resulting mixture was then molded, after which the molded article obtained was subjected to evaluation of long-term thermal aging resistance yielding the results shown in Table 1.

Example 3

Procedure from the polymerization to the pelletization polyacetal was followed in the same manner as in Example 1, except that water as a terminal stabilizing agent and triethylamine as a basic substance were added in respective proportions of 2.5 parts by weight and 0.1 part by weight, per 100 parts by weight of the polymer. The residual fluorine concentration of the polyacetal obtained was 6.7 ppm and the concentration of formaldehyde generated when the polymer was heated at 230° C. for 30 minutes in nitrogen was 250 ppm.

This polyacetal was compounded with 0.3 part by weight of triethylene glycol bis[3-(3-t-butyl-5-methyl-4-hydroxyphenyl)propionate] as an antioxidant and 0.1 part by weight of calcium stearate as a basic substance and the resulting compound was molded, after which the molded article thus obtained was subjected to evaluation of long-term thermal aging resistance yielding the results shown in Table 1.

Example 4

The same procedure as in Example 1 was repeated, except that the antioxidant added to the polyacetal obtained was replaced with 0.3 part by weight of pentaerythrityl tetrakis [3-(3,5-di-t-butyl-4-hydroxyphenyl)propionate. The long-term thermal aging resistance was evaluated, the results of which are shown in Table 1.

Example 5

The same procedure as in Example 1 was repeated, except that the antioxidant added to the polyacetal obtained was replaced with 0.3 part by weight of 4-acetoxy-2,2,6,6-tetramethylpiperidine. The long-term thermal aging resistance was evaluated, the results of which are shown in Table 1.

Example 6

The same procedure as in Example 1 was repeated, except that the basic substance added to the polyacetal obtained was replaced with 0.2 part by weight of melamine. The long-term thermal aging resistance was evaluated, the results of which are shown in Table 1.

Example 7

Procedure from the polymerization to the pelletization of polyacetal was followed in the same manner as in Example 1, except that boron trifluoride diethyl ether was added as a polymerization catalyst in a proportion of $5.0 \times 10^{-5}$ mole per mole of a total of all the monomers in place of the boron trifluoride dibutyl ether. The residual fluorine concentration of the polyacetal obtained was 14.5 ppm. The concentration of formaldehyde generated when the polymer was heated at 230° C. for 30 minutes in nitrogen was 180 ppm. This polyacetal was heat-treated at 140° C. for 2 hours in an aqueous solution containing 15% of methanol and washed two times and then dried. The residual fluorine concentration of the polyacetal obtained was 5.2 ppm, and the concentration of formaldehyde generated when the polyacetal was heated at 230° C. for 30 minutes in nitrogen was 60 ppm. This polyacetal was then compounded with 0.3 part by weight of pentaerythrityl tetrakis[3-(3,5-di-t-butyl-4-hydroxyphenyl)propionate] as an antioxidant and 0.1 part by weight of calcium stearate as a basic substance and the resulting mixture was then molded, after which the molded article thus obtained was subjected to evaluation of long-term thermal aging resistance yielding the results shown in Table 1.

Example 8

Procedure from the polymerization to the pelletization of polyacetal was followed in the same manner as in Example 1, except that water as a terminal stabilizing agent and triethylamine as a basic substance were added in respective proportions of 0.1 part by weight and 0.005 part by weight, per 100 parts by weight of the polymer. The residual fluorine concentration of the polyacetal obtained was 6.8 ppm as in Example 1; however, the concentration of formaldehyde generated when the polyacetal was heated at 230° C. for 30 minutes in nitrogen was 850 ppm.

This polyacetal was again subjected to terminal stabilization treatment under the same terminal stabilizing conditions (water as a terminal stabilizing agent and triethylamine as a basic substance were added in respective proportions of 2.5 parts by weight and 0.5 part by weight, per 100 parts by weight of the polymer). The residual fluorine concentration of the polyacetal obtained was 6.7 ppm and the concentration of formaldehyde generated when the polyacetal was heated at 230° C. for 30 minutes in nitrogen was 95 ppm.

This polyacetal was compounded with 0.3 part by weight of pentaerythrityl tetrakis[3-(3,5-di-t-butyl-4-hydroxyphenyl)propionate] as an antioxidant and 0.1 part by weight of calcium stearate as a basic substance and the resulting compound was molded, after which the molded article obtained was subjected to evaluation of long-term thermal aging resistance yielding the results shown in Table 1.

Comparative Example 1

The polyacetal obtained in Example 7 (the residual fluorine concentration was 14.5 ppm and the concentration of formaldehyde generated when the polyacetal was heated at 230° C. for 30 minutes in nitrogen was 180 ppm) was compounded with 0.3 part by weight of triethylene glycol bis[3-(3-t-butyl-5-methyl-4-hydroxyphenyl)propionate] as an antioxydant and 0.1 part by weight of calcium stearate as a basic substance, and the compound obtained was molded, after which the resulting molded article was subjected to evaluation of long-term thermal aging resistance yielding the results shown in Table 1.

Comparative Example 2

The polyacetal obtained in Example 8 (the residual fluorine concentration was 6.8 ppm and the concentration of formaldehyde generated when the polyacetal was heated at 230° C. for 30 minutes in nitrogen was 850 ppm) was compounded with 0.3 part by weight of triethylene glycol bis[3-(3-t-butyl-5-methyl-4-hydroxyphenyl)propionate] as an antioxidant and 0.1 part by weight of calcium stearate as a basic substance, and the resulting compound was molded, after which the molded article thus obtained was subjected to evaluation of long-term thermal aging resistance yielding the results shown in Table 1.

Comparative Example 3

The polyacetal obtained in Example 1 (the residual fluorine concentration was 6.8 ppm and the concentration of formaldehyde generated when the polyacetal was heated at 230° C. for 30 minutes in nitrogen was 120 ppm) was compounded with 0.3 part by weight of triethylene glycol bis[3-(3-t-butyl-5-methyl-4-hydroxyphenyl)propionate] alone as an antioxidant and the compound thus obtained was molded, after which the resulting molded article was subjected to evaluation of long-term thermal aging resistance yielding the results shown in Table 1.

Comparative Example 4

The polyacetal obtained in Example 1 (the residual fluorine concentration was 6.8 ppm and the concentration of formaldehyde generated when the polyacetal was heated at 230° C. for 30 minutes in nitrogen was 120 ppm) was compounded with 0.1 part by weight of calcium stearate alone as a basic substance and the compound obtained was molded, after which the resulting molded article was subjected to evaluation of long-term thermal aging resistance yielding the results shown in Table 1.

TABLE 1

|  | Residual fluorine conc. (ppm) | Conc. of formaldehyde generated (ppm) | Antioxidant (part by wt.) | Basic substance (part by wt.) | Thermal aging resistance 70% strength retention (day) |
| --- | --- | --- | --- | --- | --- |
| Ex. 1 | 6.8 | 120 | A, 0.3 | a, 0.1 | 65 |
| Ex. 2 | 7.7 | 180 | A, 0.3 | a, 0.1 | 59 |
| Ex. 3 | 6.7 | 250 | A, 0.3 | a, 0.1 | 57 |
| Ex. 4 | 6.8 | 120 | B, 0.3 | a, 0.1 | 63 |
| Ex. 5 | 6.8 | 120 | C, 0.3 | a, 0.1 | 62 |
| Ex. 6 | 6.8 | 120 | A, 0.3 | b, 0.2 | 58 |
| Ex. 7 | 5.2 | 60 | B, 0.3 | a, 0.1 | 70 |
| Ex. 8 | 6.7 | 95 | B, 0.3 | a, 0.1 | 65 |
| Comp. Ex. 1 | 14.5 | 180 | A, 0.3 | a, 0.1 | 45 |
| Comp. Ex. 2 | 6.8 | 850 | A, 0.3 | a, 0.1 | 41 |
| Comp. Ex. 3 | 6.8 | 120 | A, 0.3 | — | 30 |
| Comp. Ex. 4 | 6.8 | 120 | — | a, 0.1 | 22 |

Note:
Antioxidant
A: Triethylene glycol bis[(3-(3-t-butyl-5-methyl-4-hydroxyphenyl)propionate]
B: Pentaerythrityl tetrakis[3-(3,5-di-t-butyl-4-hydroxyphenyl)propionate]
C: 4-Acetoxy-2,2,6,6-tetramethylpiperidine
Basic substance
a: Calcium stearate
b: Melamine This application is based on Japanese Patent Application No. 8-030,214 filed Feb. 19, 1996 in Japan, the content of which is incorporated hereinto by reference in its entirety for all purposes.

What is claimed is:

1. A polyacetal resin composition which comprises about 100 parts by weight of a polyacetal having residual fluorine concentration of not more than about 13 ppm and a concentration of formaldehyde generated when the polyacetal is heated at about 230° C. for about 30 minutes in nitrogen of not more than about 500 ppm; from about 0.01 to about 3 parts by weight of an antioxidant; and from about 0.001 to about 5 parts by weight of a basic substance, wherein the polyacetal is a polymer obtained by polymerizing trioxane or a mixture of trioxane with a comonomer in the presence of at least one polymerization catalyst selected from the group consisting of boron trifluoride, boron trifluoride hydrate and a coordination complex compound of an organic compound containing an oxygen atom and a sulfur atom with boron trifluoride.

2. The polyacetal resin composition according to claim 1, wherein the residual fluorine concentration is not more than about 8 ppm.

3. The polyacetal resin composition according to claim 1, wherein the concentration of formaldehyde generated is not more than about 300 ppm.

4. The polyacetal resin composition according to claim 1, wherein the basic substance is at least one compound selected from the group consisting of nitrogen-containing compounds, hydroxides, inorganic acid salts of alkali metals, inorganic acid salts of alkaline earth metals, carboxylic acid salts of alkali metals and carboxylic acid salts of alkaline earth metals.

5. The polyacetal composition according to claim 1, wherein the antioxidant is at least one compound selected from the group consisting of hindered phenol compounds and hindered amine compounds.

6. A polyacetal resin composition consisting essentially of 100 parts by weight of a polyacetal, from about 0.01 to about 3 parts by weight of an antioxidant; from about 0.001 to about 5 parts by weight of a basic substance, and boron triflouride, and reaction products thereof, said composition having a residual fluorine concentration of not more than about 8 ppm and a concentration of formaldehyde generated when the polyacetal is heated at about 230° C. for about 30 minutes in nitrogen of not more than about 500 ppm.

7. The polyacetal resin composition according to claim 6, wherein the concentration of formaldehyde generated is not more than about 300 ppm.

8. The polyacetal resin composition according to claim 6 wherein the basic substance is at least one compound selected from the group consisting of nitrogen-containing compounds, hydroxides, inorganic acid salts of alkali metal, inorganic acid salts of alkaline earth metals, carboxylic acid salts of alkali metals and carboxylic acid salts of alkaline earth metals.

9. The polyacetal composition according to claim 6, wherein the antioxidant is at least one compound selected from the group consisting of hindered phenol compounds and hindered amine compounds.

10. A method for forming a polyacetal resin composition consisting essentially of 100 parts by weight of a polyacetal, from about 0.01 to about 3 parts by weight of an antioxidant; from about 0.001 to about 5 parts by weight of a basic substance, and boron trifluoride, and reaction products thereof, said composition having a residual fluorine concentration of not more than about 8 ppm and a concentration of formaldehyde generated when the polyacetal is heated at about 230° C. for about 30 minutes in nitrogen of not more than about 500 ppm, said method comprising the steps of:
    polymerizing a quantity of a monomer comprising trioxane in the presence of a polymerization catalyst selected from the group consisting of boron trifluoride, boron trifluoride hydrate and a coordination complex compound of an organic compound containing an oxygen atom and a sulfur atom with boron trifluoride, to form a polyacetal;

converting unstable terminal portions present in the polyacetal into stable terminals;

washing the resulting polyacetal with one of water, steam and a mixture of water and an organic solvent; and compounding the polyacetal with an antioxidant at a concentration of about 0.01 to about 3 parts by weight per 100 parts by weight of polyacetal, and a basic substance at a concentration of about 0.001 to about 5 parts by weight per 100 parts by weight of polyacetal.

11. The method of claim 10, wherein said step of converting comprises the steps of:

converting the polyacetal to a molten state;

adding a mixture of water and an alkaline substance to the molten polyacetal and kneading the resulting mixture; and degassifying under reduced pressure, the resulting mixture to remove free formaldehyde and said mixture of water and alkaline substance.

12. The method of claim 10, further comprising the step of adding cyclic ether at a concentration to 0.005 to 0.15 mole/mole of trioxane as a comonomer before said step of polymerizing.

13. The method of claim 10, wherein the concentration of antioxidant is between 0.01 and 1 part by weight per 100 parts by weight of polyacetal, and the concentration of the basic substance is between 0.01 and 1 part by weight per 100 parts by weight of polyacetal.

14. The method of claim 10, wherein the concentration of the polymerization catalyst is approximately $1.5 \times 10^{-5}$ mole/mole of monomer.

15. The method of claim 11, wherein the concentration of antioxidant is between 0.01 and 1 part by weight per 100 parts by weight of polyacetal, and the concentration of the basic substance is between 0.01 and 1 part by weight per 100 parts by weight of polyacetal.

16. The method of claim 15, wherein the concentration of the polymerization catalyst is approximately $1.5 \times 10^{-5}$ mole/mole of monomer.

17. The method of claim 16, further comprising the step of adding cyclic ether at a concentration to 0.005 to 0.15 mole/mole of trioxane as a comonomer before said step of polymerizing.

* * * * *

UNITED STATES PATENT AND TRADEMARK OFFICE
CERTIFICATE OF CORRECTION

PATENT NO. : 6,399,699 B1 Page 1 of 1
APPLICATION NO. : 08/799411
DATED : June 4, 2002
INVENTOR(S) : Tanigawa et al.

It is certified that error appears in the above-identified patent and that said Letters Patent is hereby corrected as shown below:

On the title page,
Item (*) delete "0" and insert --711--.

Signed and Sealed this

Fifth Day of December, 2006

JON W. DUDAS
*Director of the United States Patent and Trademark Office*